(12) United States Patent
Muraoka

(10) Patent No.: US 7,857,293 B2
(45) Date of Patent: Dec. 28, 2010

(54) FLUID FILLED TYPE VIBRATION DAMPING DEVICE

(75) Inventor: Mutsumi Muraoka, Aichi-gun (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 1126 days.

(21) Appl. No.: 11/528,438

(22) Filed: Sep. 28, 2006

(65) Prior Publication Data

US 2007/0090578 A1    Apr. 26, 2007

(30) Foreign Application Priority Data

Sep. 30, 2005    (JP)    ............................. 2005-286775

(51) Int. Cl.
*F16F 5/00*    (2006.01)
*F16M 13/00*    (2006.01)

(52) U.S. Cl. ........................... 267/140.11; 267/140.12; 267/140.13; 267/141.4; 267/219; 248/562; 248/636; 403/353

(58) Field of Classification Search ............ 267/140.11, 267/140.12, 140.13, 141.4, 219; 248/562, 248/636

See application file for complete search history.

(56) References Cited

U.S. PATENT DOCUMENTS 5,735,511 A * 4/1998 Stocker et al. ......... 267/140.13
6,612,554 B1 * 9/2003 Linn ..................... 267/140.13
6,971,639 B2  12/2005 Okada et al.

FOREIGN PATENT DOCUMENTS

| JP | A-5-118375 | 5/1993 |
|----|------------|--------|
| JP | A-8-42628 | 2/1996 |
| JP | A-2000-9116 | 1/2000 |
| JP | A 2001-108008 | 4/2001 |
| JP | A 2001-336564 | 12/2001 |
| JP | A 2003-139189 | 5/2003 |
| JP | A 2004-144237 | 5/2004 |
| JP | A 2004-144238 | 5/2004 |

* cited by examiner

*Primary Examiner*—Bradley T King
*Assistant Examiner*—Mahbubur Rashid
(74) *Attorney, Agent, or Firm*—Oliff & Berridge, PLC

(57) ABSTRACT

A fluid filled type vibration damping device includes a fluid chamber divided by a partition member into a pressure-receiving chamber and an equilibrium chamber. The partition member has a first and a second member axially superposed together. A locking projection is formed on one of the first member or the second member and a locking hole is formed on an other, with the locking projection being inserted through the locking hole to effect locking so as to constitute a locking mechanism for holding the first and second member in a superposed state. Outer circumferential faces of the first member and the second member held in the superposed state by the locking mechanism are fastened fitting into a second mounting member via a seal rubber layer, and the first or second member having the locking hole includes a cover portion that covers an opening of the locking hole from a side thereof to which the locking projection projects.

9 Claims, 7 Drawing Sheets

FLUID FILLED TYPE VIBRATION DAMPING DEVICE

INCORPORATED BY REFERENCE

The disclosure of Japanese Patent Application No. 2005-286775 filed on Sep. 30, 2005 including the specification, drawings and abstract is incorporated herein by reference in its entirety.

BACKGROUND OF THE INVENTION

1. Field of the Invention

The present invention relates generally to a fluid filled type vibration damping device capable of providing vibration damping effect based on the flow action of a fluid sealed therein, and more particularly to a fluid filled type vibration damping device having a partition member disposed therein to form a plurality of fluid chambers, with the plurality of fluid chambers communicating with one another through an orifice passage.

2. Description of the Related Art

Fluid filled type vibration damping devices designed to produce vibration damping effect on the basis of resonance action or other fluid action of a fluid sealed in the interior are known as one type of vibration damping device such as a vibration damped coupling or vibration damped support designed for installation between components making up a vibration transmission system. In such a fluid filled type vibration damping device, as taught in JP-A-2003-139189 for example, a first metal mounting member is disposed on the side of a first opening of a second metal mounting member of tubular shape, the first mounting member and the second mounting member are elastically connected by a main rubber elastic body with one opening of the second mounting member being sealed off fluid-tightly, while the other opening of the second mounting member is sealed off fluid-tightly by a flexible film, thereby forming between the main rubber elastic body and the flexible film a fluid chamber in which a non-compressible fluid is sealed. A partition member supported by the second mounting member is disposed between the main rubber elastic body and the flexible film, thereby dividing the fluid chamber to form to either side of the partition member a pressure-receiving chamber whose wall is partially constituted by the main rubber elastic body and an equilibrium chamber whose wall is partially constituted by the flexible film, with the two chambers communicating with each other through an orifice passage.

For structural reasons, the partition member in a fluid filled type vibration damping device is sometimes composed of a plurality of superposed members. This is because complex shape or construction may be needed, for example, to form a long orifice passage, a plurality of orifice passages, or various other orifice passages, or to form an internal rubber film, auxiliary fluid chamber, air chamber or the like. To fasten such a partition member to the second mounting member, a plurality of members are superposed in the axial direction, fitted internally into the tubular wall portion of the second mounting member, and the tubular wall portion subjected to drawing or other diameter-constricting process, whereby the partition member composed of the plurality of members is fixedly fasten into the tubular wall portion. Mainly for the purpose of improving sealing of the orifice passage formed in the partition member, the outer circumferential face of each of the plurality of members is positioned in intimate contact against the inside peripheral face of the tubular wall portion, via a rubber layer formed on the inside peripheral face.

In a partition member of the kind described above, in order to facilitate handling, management, and the process of assembly with the second mounting member, it is preferable for the plurality of members to be fastened in the superposed state in advance, and subsequently fastened to the second mounting member. Conceivable ways of doing so are welding or bonding the plurality of members together, or fastening them press-fit together, in advance. However, fastening them inevitably requires special operations, materials, and equipment. As long as the plurality of members are ultimately fastened fitting into the second mounting member, it suffices for them to be fastened temporarily in the superposed state, so such fastening methods are not always appropriate.

Accordingly, there has been contemplated a mechanical locking mechanism, as means for temporarily fastening a plurality of members prior to fastening them fitting into the second mounting member. A specific example is that disclosed in JP-A-2004-144237, for example. JP-A-2004-144237 teaches a locking mechanism wherein at least one of two members to be fastened superposed to each other is a resin molding, with a locking projection being formed in one and a locking hole being formed in the other, and locked together by inserting the locking projection through the locking hole.

However, research carried out by the inventors has revealed the problem caused by differences in the assembly method of the second mounting member with the partition member. For instance, in cases where the partition member is fastened by means of drawing the tubular wall portion of the second mounting member for example, differences in the tubular wall portion drawing ratio or drawing diameter, or the contact surface area of the drawn portion, may possibly causes the problem that the locking projection which makes up part of the locking mechanism may be lost.

Specifically, when subjecting the tubular wall portion of the second mounting member to a diameter constricting process to fastening a partition member fitting therein, if the rubber layer covering the inside peripheral face of the tubular wall portion should become compressed in the axis-perpendicular direction between the tubular wall portion and the partition member, the rubber layer may undergo elastic deformation so as to contract in the axial direction. In association with contraction of the rubber layer, the plurality of members locked together in the axial direction by means of the locking mechanism are subjected to external force in the axial direction, acting in the direction moving them apart. It has been found that, the action of this external force possibly causes that the locking projection which has been formed of resin material as a temporarily fastening may break off owing to differences in assembly method as mentioned previously.

Break-off of the locking projection poses no problem with regard to fastening the plurality of members together, with the plurality of members fastened to the second mounting member. This is because the fastening force fastening the plurality of members together is provided by the members being fitted fastened on the basis of diameter constriction of the second mounting member. However, if the broken off locking projection should drop into the fluid chamber, there is a risk of it entering and clogging the orifice passage, or contacting the flexible film and damaging it.

SUMMARY OF THE INVENTION

It is therefore one object of this invention to provide a fluid filled type vibration damping device of novel construction, that entails no increase in the number of special parts or in the number of assembly operation steps, and that effectively prevents problems caused by break-off of the locking projection, before they can occur.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid filled type vibration damping device comprising a first mounting member; a second mounting member of tubular shape, the first mounting member being disposed on a side of one opening of the second mounting member; a main rubber elastic body elastically connecting the first mounting member and the second mounting member; a flexible film by which an other opening of the second mounting member is sealed off fluid-tightly, thereby forming between opposing faces of the main rubber elastic body and the flexible film a fluid chamber in which a non-compressible fluid is sealed; and a partition member supported by the second mounting member, with the fluid chamber divided by the partition member into a pressure-receiving chamber whose wall is partially defined by the main rubber elastic body and an equilibrium chamber whose wall is partially defined by the flexible film, and with an orifice passage connecting the pressure-receiving chamber and the equilibrium chamber being formed, wherein: the partition member comprises a first member and a second member superposed together in an axial direction of the second mounting member; a locking projection is formed on one of the first member and the second member and a locking hole is formed on an other, with the locking projection being inserted through the locking hole to effect locking so as to constitute a locking mechanism for holding the first member and the second member in a superposed state; outer circumferential faces of the first member and the second member held in the superposed state by the locking mechanism are fastened fitting into the second mounting member via a seal rubber layer covering an inner circumferential face of a tubular wall portion of the second mounting member by constricting an diameter of the tubular wall portion; and the first member or the second member in which the locking hole has been formed thereon a cover portion that covers an opening of the locking hole from a side thereof to which the locking projection projects.

In the fluid filled type vibration damping device constructed according to this mode, the first member and the second member are mechanically attached by a locking mechanism, and thus the two members can be attached by an easy procedure, without the need for a special procedure, materials, equipment and so on. Since the first member and the second member making up the partition member are held in the superposed state prior to being fastened fitting into the second mounting member, ease of handling and management of these members is excellent.

The partition member is fastened to the second mounting member by means of fastening the outer circumferential faces of the first member and the second member held in the superposed state fitted into the second mounting member via the seal rubber layer covering the inside face of the tubular wall portion, on the basis of the constricted diameter of the tubular wall portion of the second mounting member. Consequently, the labor entailed in separately fastening the first member and the second member to the second mounting member can be avoided, thus affording an easy procedure for attaching the partition member to the second mounting member.

Research conducted by the inventors has shown that when the seal rubber layer disposed between the first and second members and the tubular wall portion is compressed in the axis-perpendicular direction in association with diameter constriction of the second mounting member, the seal rubber layer undergoes elastic deformation so as to contract in the axial direction. It was newly discovered that, in association with contraction of the seal rubber layer, the first member and second member undergo displacement in the axial direction in the direction of moving apart from each other, and this displacement causes stress concentration and a high level of strain in the locking projection interlocked with the locking hole, with the risk of break-off of the locking projection.

On the basis of this new discovery, in the first member or the second member in which the locking hole has been formed, a cover portion is formed so as to cover the opening of the locking hole from the side thereof to which the locking projection projects. With this arrangement, even if the locking projection should break off, it will be supported by the cover, preventing the locking projection from falling into the fluid chamber. Consequently, it is possible to eliminate various problems which could be caused by the locking projection falling into the fluid chamber, such as clogging of the orifice passage by the locking projection or damage to the flexible film caused by contact with the locking projection.

As long as fastening force for holding the first member and the second member in the superposed state is afforded by the locking mechanism prior to fastening the first and second members to the second mounting member, even if the locking mechanism should become released due to break-off of the locking projection once the first and second members have been fastened fitting into the second mounting member, sufficient fastening force will be afforded nevertheless by means of them being fastened to the second mounting member. That is, with the first and second members fastened to the second mounting member, break-off of the locking projection will not have any appreciable effect on the constitution of the partition member consisting of the first and second members. Consequently, there is no need for any special considerations with regard to the material or construction of the first and second members or the locking projection, and the advantages of easy fabrication and reduced production cost may be attained.

Accordingly, with the fluid filled type vibration damping device according to this mode, ease of assembly operation and reduced production cost can be advantageously attained, while favorably ensuring the desired quality and reliability of vibration damping ability.

A second mode of the invention provides a fluid filled type vibration damping device according to the first mode, wherein the orifice passage is formed by the first member and the second member.

In this mode, there is a high degree of freedom as to modification of design elements such as the shape, size, construction, placement, and number of orifice passages, and consequently a high degree of freedom in tuning of the resonance of the fluid caused to flow through the orifice passages, so that vibration damping action may be more advantageously realized.

A third mode of the invention provides a fluid filled type vibration damping device according to the first or second mode, wherein the locking projections and the locking holes are formed at multiple locations on a circumference of an outer peripheral portion of the first member and the second member respectively.

In this mode, multiple locking mechanisms are provided, whereby the first member and the second member may be fastened more stably. It is also possible to employ, for example, a rotary type locking mechanism wherein the locking projections are inserted into the locking holes, and the first member and second member then turned relative to each other so that the locking projections become locked in the locking holes. Where such a rotary type locking mechanism is employed, the first member and second member may be attached easily and securely.

A fourth mode of the invention provides a fluid filled type vibration damping device according to any one of the first through third modes, wherein the cover portion formed on the first member or the second member is formed by an upright wall portion rising up from a rim of the locking hole towards the projection side of the locking projection, and a roof wall portion bending from a distal edge of the upright wall portion so as to be spaced apart while covering the locking hole, with the upright wall portion being formed along a portion of the circumference of the locking hole so that the cover portion is open at the side, and with the roof wall portion being formed with a size equal to or smaller than the opening of the locking hole.

In this mode, utilizing the opening of the locking hole and an opening at the side of the cover portion, a cover portion composed of an upright wall portion and a roof wall portion can be integrally formed with the first member or second member by means of a molding process. Ease of fabrication is afforded more advantageously thereby.

A fifth mode of the invention provides a fluid filled type vibration damping device according to any one of the first through fourth modes, wherein in the first member or the second member in which the locking hole has been formed, an outer circumferential wall portion projecting in a direction of projection of the locking projection is formed at an outer circumferential edge of the first or second member, and the cover portion has a pouch structure opening on an outer peripheral side towards the outer circumferential wall portion, while the locking projection includes a leg portion passing through the locking hole and a head portion bending in a hooked shape from a projecting distal end of the leg portion, and is locked in place with the head portion extending towards the outer circumferential wall portion from the locking hole.

In this mode, the locking projection has the hooked shape composed of the leg portion and the head portion, while the cover portion is of pouch shape opening towards the outer circumferential wall portion, thereby providing a structure whereby it is difficult for the locking projection to fall in from the opening of the cover portion. Consequently, the function of preventing a broken off locking projection from falling into the fluid chamber can be more advantageously realized. Additionally, on the basis of the hooked shape of the locking projection and the pouch shape of the cover portion, both the locking projection and the cover portion can be given an integral structure with the first and second members by means of a molding process, as a result of which ease of fabrication may be improved.

A sixth mode of the invention provides a fluid filled type vibration damping device according to any one of the first through fifth modes, wherein the first member and the second member are superposed with an elastic material sandwiched between their center portions, and provided with the locking mechanisms at multiple locations in an outer circumferential portions thereof.

In this mode, when the first member and second member are held superposed in the axial direction by means of locking mechanisms with an elastic material sandwiched between them, reactive force directed in the direction separating of the first member and second member in the axial direction is produced on the basis of the elastic force of the elastic material. By means of this reactive force, a higher level of locking action of the locking projections and the locking holes is attained, and the first member and second member may be more stably maintained in the fastened state.

A seventh mode of the invention provides a fluid filled type vibration damping device according to any one of the first through sixth modes, wherein the first member has a movable member attached in a center portion thereof, while the second member has a working air chamber formed by a recess formed in a center portion thereof and covered by a rubber cover.

In this mode, it is possible to adjust the pressure fluctuation of the fluid chamber on the basis of displacement or deformation of the movable member and adjustment or control of the pressure of the working air chamber, and to thereby more consistently produce the intended vibration damping action. Additionally, since the movable member and the working air chamber are furnished efficiently utilizing the center portion of the first member and the center portion of the second member, a more compact vibration damping device can be advantageously achieved.

An eighth mode of the invention provides a fluid filled type vibration damping device according to any one of the first through seventh modes, wherein the locking projection has a structure weakest in terms of strength at a basal end thereof.

In this mode, since the locking projection breaks off easily at its basal end, sufficient shape and size of the broken off locking projection may be assured. Consequently, the locking projection is reliably supported by the cover portion, and the locking projection is more advantageously prevented from falling into the fluid chamber.

As will be apparent from the preceding description, in the fluid filled type vibration damping device according to the present invention, a first member and a second member held in the superposed state by a locking mechanism constitute the partition member, and with the partition member fastened fitting into the second mounting member, the locking projection is supported by a cover portion, even if the locking projection should break off. This arrangement makes it possible to eliminate various problems which could be caused by the locking projection falling into the fluid chamber, such as clogging of the orifice passage by the locking projection or damage to the flexible film caused by contact with the locking projection. Consequently, ease of assembly operation and reduced production cost can be advantageously attained, while consistently achieving the desired vibration damping ability and quality.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
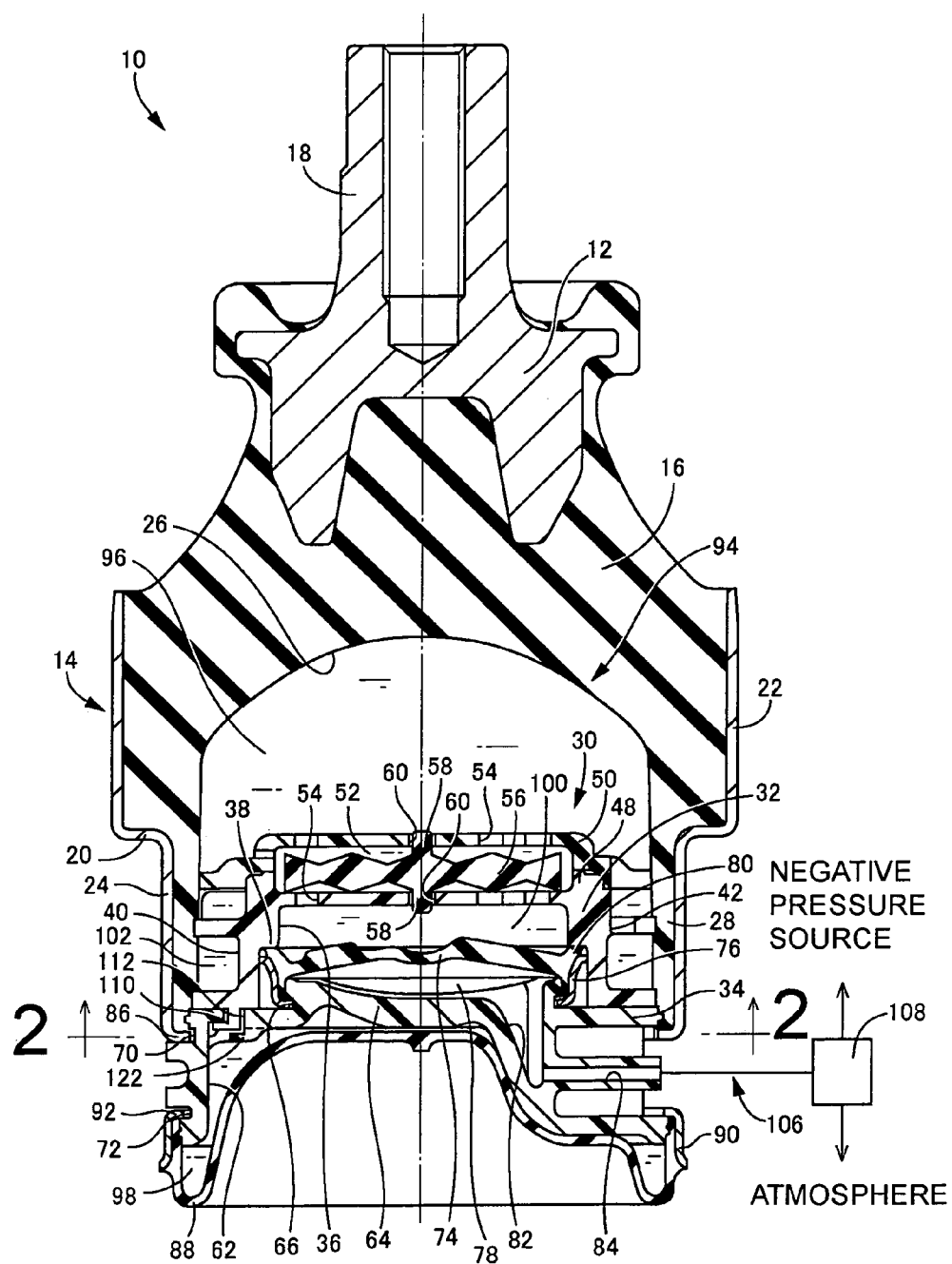
FIG. 1 is an elevational view in axial or vertical cross section of a fluid filled type vibration damping device in the form of an automotive engine mount, which is constructed according to one preferred embodiment of the invention taken along line 1-1 of FIG. 2.
Figure 2:
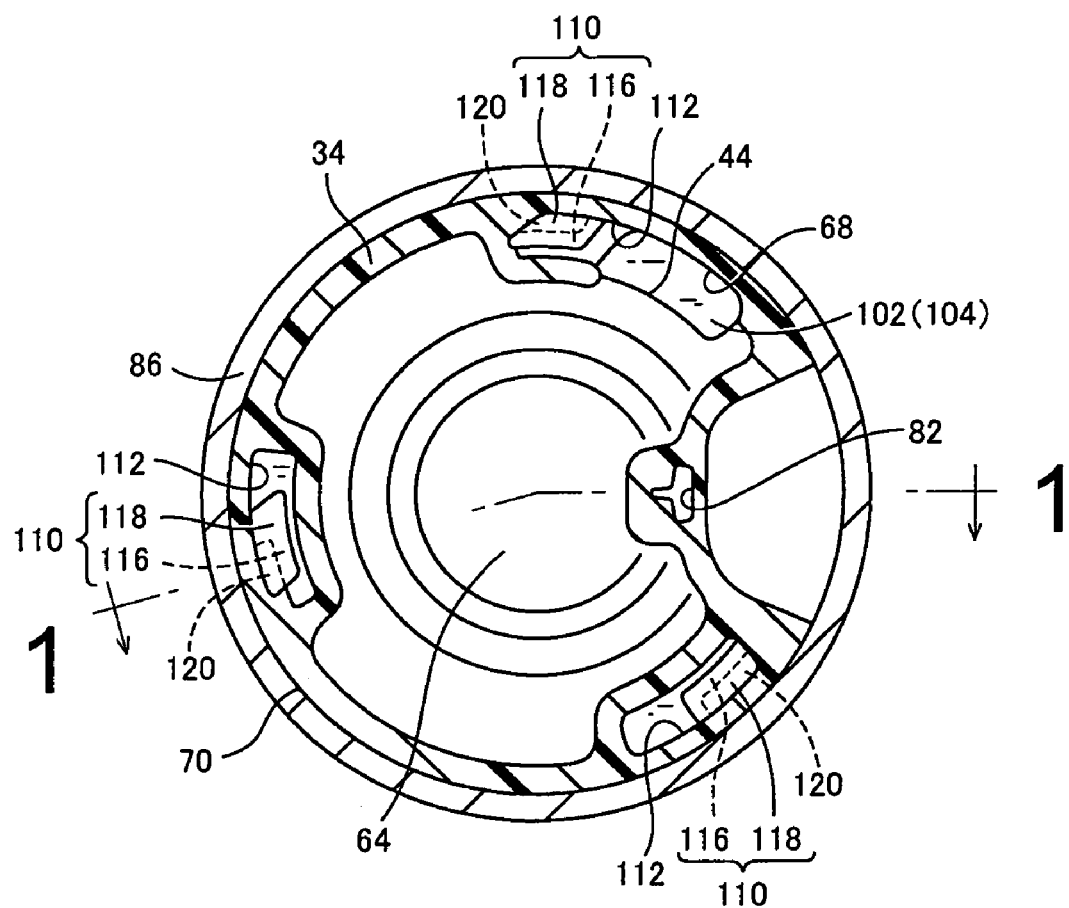
FIG. 2 is a cross sectional view taken along line 2-2 of FIG. 1.

Referring first to FIGS. 1 and 2, there is depicted a fluid filled type vibration damping device of an automotive engine mount 10 according to a first mode of the invention. This engine mount 10 includes a first mounting member 12 of metal, a second mounting member 14 of metal, and a main rubber elastic body 16 by which the first and second mounting members 12, 14 are elastically connected. By mounting the first mounting member 12 to a power unit side and mounting the second mounting member 14 to a body side of a vehicle, the power unit is supported in vibration-damping fashion on the vehicle body. In FIG. 1, the engine mount 10 is shown as it would appear when not installed in an automobile. In the illustrated state, the distributed support load of the power unit would be input in the axial direction of the mounting (the vertical in FIG. 1), and on the basis of elastic deformation of the main rubber elastic body 16, the first mounting member 12 and second mounting member 14 will undergo displacement in the direction moving closer together, with the principal direction of input of vibration generally coincident with the axial direction of the mount. In the description hereinbelow the vertical direction shall as general rule refer to the vertical direction in FIG. 1.

Described more specifically, the first mounting member 12 has a cup shape open at the bottom. In the center portion of the first mounting member 12 is integrally formed a nut portion 18 furnished with a screw hole which opens upward.

The second mounting member 14, meanwhile, has a large-diameter, stepped round tubular shape, with the section thereof above a step portion 20 formed in the axially medial portion constituting a large-diameter tube portion 22 and the section below constituting a small-diameter tube portion 24 of smaller diameter dimension than the large-diameter tube portion 22. The first mounting member 12 is position spaced apart to one side (above in FIG. 1) of the second mounting member 14, with the center axes of the two members 12, 14 being positioned on approximately the same line, and with the main rubber elastic body 16 disposed between the first mounting member 12 and the second mounting member 14.

The main rubber elastic body 16 has a large-diameter, generally frustoconical shape, and is bonded by vulcanization at its small-diameter end face to an outer circumferential face of the first mounting member 12, which is embedded in it substantially entirely except for the nut portion 18. The outer circumferential face at the large-diameter end of the main rubber elastic body 16 is bonded by vulcanization to the inside peripheral face of the large-diameter tube portion 22 and step portion 20 of the second mounting member 14. That is, the main rubber elastic body 16 is constituted as an integrally vulcanization molded component with the first mounting member 12 and the second mounting member 14. With this arrangement, the first mounting member 12 and the second mounting member 14 are elastically connected together by means of the main rubber elastic body 16, with the opening at one side (the upper side in FIG. 1) of the large-diameter tube portion 22 of the second mounting member 14 sealed off fluid-tightly by the main rubber elastic body 16. A large-diameter recess 26 of generally conical shape opening downward is furnished to the large-diameter end face of the main rubber elastic body 16. A thin seal rubber layer 28 integrally formed with the main rubber elastic body 16 is formed on the inside peripheral face of the small-diameter tube portion 24 of the second mounting member 14, so as to cover substantially the entirety thereof, at generally uniform thickness.

The integrally vulcanization molded component of the main rubber elastic body 16 with the first mounting member 12 and the second mounting member 14 has a partition member 30 attached thereto from the opening on the other side (the lower side in FIG. 1) of the second mounting member 14.

The partition member 30 has a generally circular rod shape overall, and its outside diameter dimension is smaller than the inside diameter dimension of the small-diameter tube portion 24 of the second mounting member 14. The partition member 30 is of split construction composed of a plurality of members assembled together, and includes a first partition member 32 as a first member and a second partition member 34 as a second member.

Figure 3:
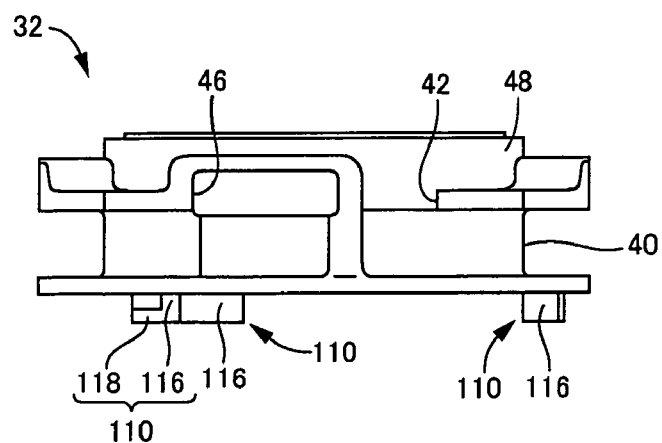
FIG. 3 is a side elevational view of a first partition member of the engine mount of FIG. 1.
Figure 4:
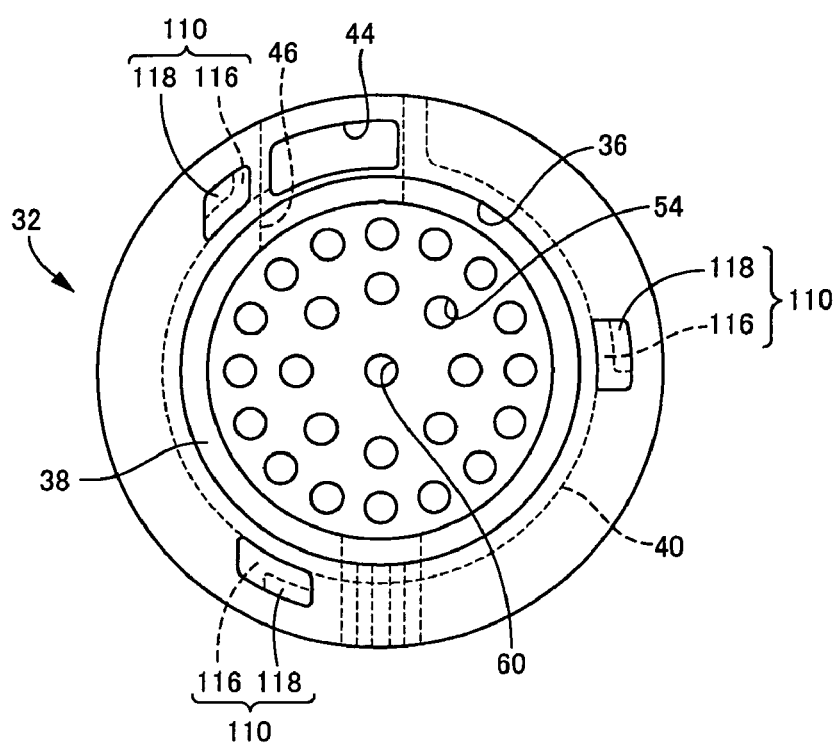
FIG. 4 is a bottom plane view of the first partition member of FIG. 3.

As shown in FIGS. 3 and 4, the first partition member 32 has a thick, generally disk shape, and is formed using hard synthetic resin material. A large-diameter center recess 36 opening onto the center of the lower face is formed as a recess in the first partition member 32. By giving the center recess 36 a large depth dimension, the center upper portion of the first partition member 32 making up the upper base of the center recess 36 assumes a thin, generally disk shape. In the axially medial portion of the center recess 36 is formed an annular step portion 38 that spreads outward in the axis-perpendicular direction. With this arrangement, the diameter dimension of the peripheral wall of the center recess 36 on the upper base side (upper side in FIG. 1) of the step portion 38 is smaller than the diameter dimension of the peripheral wall of the opening side (lower side in FIG. 1) of the step portion 38.

In the outer circumferential portion of the first partition member 32, there is formed a circumferential groove 40 that extends a predetermined length in the circumferential direction (in this mode, just short of once around), with a generally unchanging cross section that opens outward in the axis-perpendicular direction. One end of the circumferential groove 40 opens upward through a communicating window 42 of notch shape-formed in the upper end of the first partition member 32, while the other end of the circumferential groove 40 opens downward through a communicating hole 44 perforating the lower end of the first partition member 32. In the axially medial portion of the first partition member 32 spaced apart upward from the communicating hole 44, the circumferential groove 40 connects with a communicating passage 46 that extends in a tunnel shape in the axial direction and axis-perpendicular direction of the first partition member 32. The inside of the communicating passage 46 opens onto the peripheral wall of the center recess 36, so that the circumferential groove 40 opens into the center recess 36 via the communicating passage 46.

An annular projecting portion 48 of annular shape is formed in the center of the upper end portion of the first partition member 32. A cap member 50 is attached to the annular projecting portion 48. The cap member 50 is formed from hard synthetic resin material, and is of circular dish shape such that the center portion thereof distends upward in a circular profile. The outer circumferential portion of the cap member 50 is superposed against the annular projecting portion 48 of the first partition member 32 and affixed thereto by welding or the like, thereby attaching the cap member 50 to the first partition member 32. A constrained installation zone 52 of generally circular shape is formed between the first partition member 32 and the cap member 50. Through-holes 54 consisting of a multitude of small holes are formed in the circular center portions of the first partition member 32 and the cap member 50 which constitute the upper and lower walls of the constrained installation zone 52.

A movable plate 56 serving as the movable member is positioned housed within the constrained installation zone 52. The movable plate 56 has thin, generally circular disk shape and is formed of elastomer material. In this mode in particular, a plurality of projections and grooves are furnished on the upper and lower ends of the movable plate 56 so that it has a plurality of undulations. The thickness dimension of the movable plate 56 is smaller than the vertical inside dimension of the constrained installation zone 52, and the outside diameter dimension of the movable plate 56 is smaller than the sideways inside dimension of the constrained installation zone 52. A pair of center shaft portions 58, 58 projecting to either side in the axial direction are integrally formed in the center portion of the movable plate 56. Each center shaft portion 58 fits displaceably inserted into a through-hole 60 perforating the center axis of the first partition member 32 and the cap member 50 respectively. By means of this design, the movable plate 56 is positioned in the approximate center of the constrained installation zone 52 so as to be capable of displacement in the axial direction by the equivalent of the distance separating the upper end of the movable plate 56 from the center portion of the cap member 50 which constitutes the upper wall portion of the zone 52, or of the distance separating the lower end of the movable plate 56 from the center portion of the first partition member 32 which constitutes the lower wall portion of the zone 52. By means of the movable plate 56 striking against the cap member 50 or the first partition member 32, the extent of axial displacement of the movable plate 56 is limited in a cushioned manner, in conjunction with elastic deformation of the plate per se.

Figure 5:
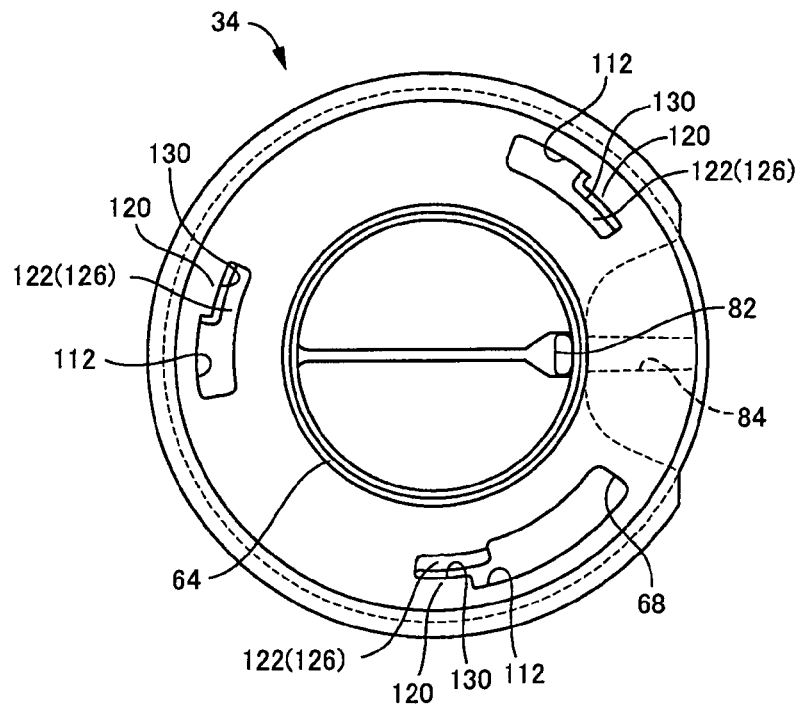
FIG. 5 is a side elevational view of a second partition member of the engine mount of FIG. 1.
Figure 6:
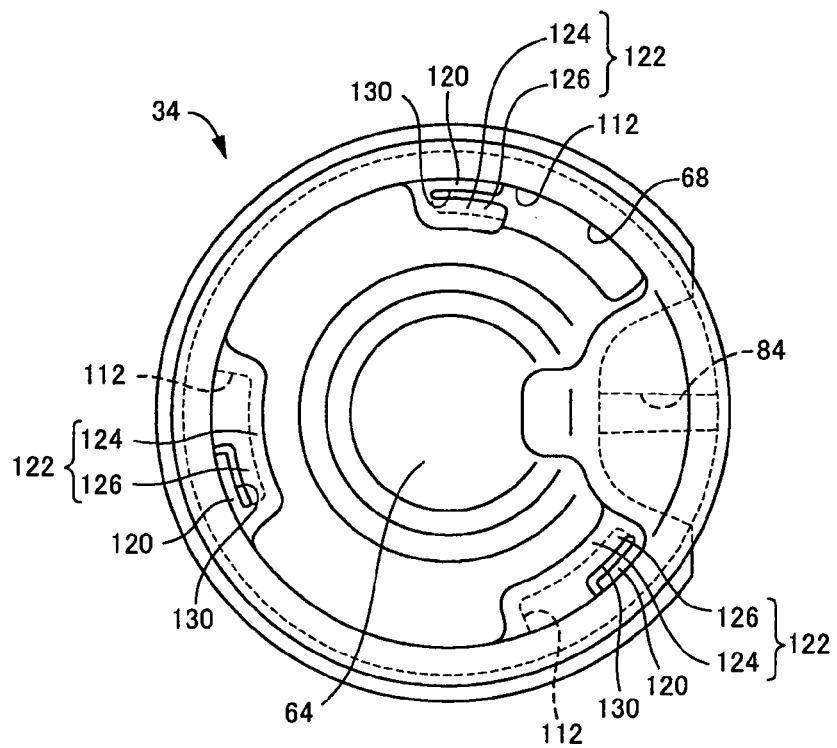
FIG. 6 is a bottom plane view of the second partition member of FIG. 5.

Meanwhile, as shown in FIGS. 5 and 6, the second partition member 34 has a thick, generally disk shape, and is formed of hard synthetic resin material. A lower recess 62 that opens onto the center of the lower face is formed in the second partition member 34. In the center of the upper end portion of the second partition member 34 is integrally formed a center projecting portion 64 of shallow bowl shape. A mating groove 66 extending a predetermined length in the circumferential direction is cut into the outer circumferential wall on the basal end side of the center projecting portion 64. On the outer circumferential portion of the second partition member 34 is formed a communicating hole 68 which extends in the axial direction to open onto the upper end face around the center projecting portion 64, and onto the lower end face on the floor side of the lower recess 62, in the second partition member 34. The upper peripheral portion and lower peripheral portion of the second partition member 34 are respectively furnished with an upper mating groove 70 and a lower mating groove 72 each extending a predetermined length in the circumferential direction.

A pressure adjustment rubber plate 74 of generally disk shape serving as the rubber cover is disposed on the center projecting portion 64 of the second partition member 34. To the outer circumferential edge (face) of the pressure adjustment rubber plate 74 is vulcanization bonded an annular mating ring 76. The mating ring 76 fits externally around the peripheral wall of the center projecting portion 64, with the portion of the mating ring 76 below the axially medial portion being subjected to a diameter constricting process and the lower end of the mating ring 76 which has been bent diametrically inward being fastened detained within the mating groove 66 of the center projecting portion 64. With this arrangement, the opening portion of the center projecting portion 64 is covered by the pressure adjustment rubber plate 74, and a working air chamber 78 sealed off from the outside is formed between the floor of the center projecting portion 64 and the pressure adjustment rubber plate 74. The inside peripheral face of the mating ring 76 fitted externally around the peripheral wall of the center projecting portion 64 is covered by a seal rubber layer integrally formed with the pressure adjustment rubber plate 74; this seal rubber layer undergoes elastic deformation between the mating ring 76 and the peripheral wall of the center projecting portion 64 so as to come into intimate contact against the inside peripheral face of the pressure adjustment rubber plate 74 and the outer circumferential face of the peripheral wall of the center projecting portion 64, thereby providing the working air chamber 78 with a higher level of fluid-tightness. The upper edge of the mating ring 76 is bent into flange shape, and a seal lip 80 integrally formed with the pressure adjustment rubber plate 74 is integrally formed at the upper edge thereof. This seal lip 80 extends continuously in the circumferential direction of the pressure adjustment rubber plate 74, with a substantially unchanging peak shaped cross section.

An air passage 82 is formed within the second partition member 34. One end of the air passage 82 connects to the working air chamber 78, while the other end of the air passage 82 connects to an exposed port 84 formed on the outer circumferential face of the second partition member 34.

In this mode in particular, the outside diameter dimension of the upper end of the mating ring 76, which represents the maximum outside diameter dimension of the mating ring 76 of the second partition member 34, and slightly smaller than the inside diameter dimension of the center recess 36 on the opening side of the step portion 38, which represents the maximum inside diameter dimension of the center recess 36 of the first partition member 32. The diameter dimension of the seal lip 80 covering the upper end of the mating ring 76 is approximately the same as the diameter dimension of the step portion 38 of the first partition member 32.

The mating ring 76 of the second partition member 34 is inserted into the center recess 36 of the first partition member 32, and the upper end of the mating ring 76 is superposed against the step portion 38 of the center recess 36 via the seal lip 80, while the lower end face of the first partition member 32 around the center recess 36 and the upper end face of the second partition member 34 around the mating ring 76 are superposed against one another in the axial direction of the two members 34, 36. The axial direction of the first partition member 32 and the second partition member 34 is parallel with the axial direction of the integrally vulcanization molded component of the main rubber elastic body 16 incorporating the first and second mounting members 12, 14.

The first and second partition members 32, 34, superposed in the axial direction, are inserted in the axial direction from the opening of the small-diameter tube portion 24 of the second mounting member 14 (the lower end in FIG. 1). The lower end face of an internal flange-shaped mating projection 86 formed at the other end of the second mounting member 14 is superposed against the upper face of the outer circumferential portion of the second partition member 34, whereby the first and second partition members 32, 34 are positioned in the axial direction with respect to the second mounting member 14 so that their outer circumferential faces and the inside peripheral face of the small-diameter tube portion 24 of the second mounting member 14 are disposed in opposition in the axis-perpendicular direction. The second mounting member 14, including its small-diameter tube portion 24, is subjected to a diameter constricting operation, whereby the outer circumferential faces of the first and second partition members 32, 34 are superposed fluid-tightly against the inside peripheral face of the small-diameter tube portion 24 via the seal rubber layer 28 formed on the inside peripheral face of the small-diameter tube portion 24, and the mating projection 86 is fastened locking into the upper mating groove 70 of the second partition member 34. With this arrangement, the partition member 30 including the first partition member 32 and the second partition member 34 is fastened mating with the second mounting member 14 so as to spread out in the axis-perpendicular direction. As will be apparent from this arrangement, in this mode, the tubular wall portion of the second mounting member 14 is constituted including the small-diameter tube portion 24. A diaphragm 88 serving as the flexible film is attached to the lower end of the partition member 30.

The diaphragm 88 is constituted as a thin rubber elastic film of generally disk shape whose center portion has enough slack to allow it to deform readily. A fastening fitting 90 having the form of a large-diameter circular tube is vulcanization bonded to the outer circumferential edge (face) of the diaphragm 88. A mating projection 92 extending in an internal flange-shape is formed at the upper end of the fastening fitting 90. The inside peripheral face of the fastening fitting 90 is covered by a thin seal rubber layer integrally formed with the diaphragm 88. This fastening fitting 90 is fitted externally onto the second partition member 34, from the opening thereof furnished with the mating projection 92 (the upper side in FIG. 1), and the fastening fitting 90 is subjected to a diameter constricting operation. With this arrangement, the lower outer circumferential face of the second partition member 34 is superposed fluid-tightly against the inside peripheral face of the fastening fitting 90 via the seal rubber layer formed on the inside peripheral face of the fastening fitting 90, and the mating projection 92 is fastened locking into the lower mating groove 72 of the second partition member 34, attaching the diaphragm 88 to the partition member 30.

By means of this arrangement, the other opening of the second mounting member 14 (on the lower side in FIG. 1) is sealed off fluid-tightly by the diaphragm 88 via the partition member 30, and the partition member 30 is positioned between the faces of the main rubber elastic body 16 and the diaphragm 88 in opposition in the axial direction (vertical direction in FIG. 1).

Between the superposed faces of the main rubber elastic body 16 and the diaphragm 88 sealed off from the outside space is formed a fluid chamber 94 in which a noncompressible fluid is sealed. As the sealed fluid, it is possible to use water, an alkylene glycol, a polyalkylene glycol, silicone oil or the like. In order to effectively attain vibration damping action based on flow behavior such as resonance behavior of the fluid, a low-viscosity fluid having viscosity of 0.1 Pa·s or lower is preferred. Sealing of the non-compressible fluid within the fluid chamber 94 is advantageously accomplished, for example, by carrying out the process of assembling the partition member 30 and the diaphragm 88 with the integrally vulcanization molded component of the main rubber elastic body 16 incorporating the first and second mounting members 12, 14, while these are immersed in the noncompressible fluid.

Within the interior of the fluid chamber 94, the partition member 30 is arranged so as to extend in the axis-perpendicular direction, thereby dividing the changer into two parts. To one side of this partition member 30 in the axial direction (the upper side in FIG. 1) there is formed a pressure-receiving chamber 96 a portion of whose wall is constituted by the main rubber elastic body 16, and which gives rise to pressure fluctuations on the basis of elastic deformation of the main rubber elastic body 16 when vibration is input across the first mounting member 12 and the second mounting member 14. To the other side of this partition member 30 in the axial direction (the lower side in FIG. 1), there is formed an equilibrium chamber 98 whose wall is partially constituted by the diaphragm 88 and that readily permits change in volume on the basis of elastic deformation of the diaphragm 88.

The step portion 38 of the center recess 36 in the first partition member 32 and the upper end of the mating ring 76 in the second partition member 34 are superposed fluid-tightly against one another to either side of the seal lip 80 which undergoes compressive deformation between them in the axial direction, whereby a small-diameter zone situated to the upper side of the step portion 38 of the center recess 36 is covered fluid-tightly by the pressure adjustment rubber plate 74. The center recess 36 sealed off by this pressure adjustment rubber plate 74 forms an intermediate chamber 100 that, like the pressure-receiving chamber 96 and the equilibrium chamber 98, has noncompressible fluid sealed therein.

One face of the movable plate 56 faces the pressure-receiving chamber 96 through the through-holes 54 formed in the cap member 50, while the other face of the movable plate 56 faces the intermediate chamber 100 via the through-holes 54 formed in center portion of the first partition member 32, in other words, in the upper base portion of the center recess 36. As a result, the movable plate 56 is positioned displaceably in its thickness direction (the vertical direction in FIG. 1) within the constrained installation zone 52, whereby on the basis of flow behavior of fluid through the through-holes 54, pressure is transmitted between the pressure-receiving chamber 96 and the intermediate chamber 100. The level of pressure transmission is regulated on the basis of regulating the extent of displacement of the movable plate 56 as the movable plate 56 strikes the first partition member 32 or the cap member 50.

The circumferential groove 40 of the first partition member 32 is covered fluid-tightly by the small-diameter tube portion 24, with the seal rubber layer 28 formed on the inside peripheral face of the small-diameter tube portion 24 of the second mounting member 14 sandwiched between them, thereby forming a first orifice passage 102 serving as an orifice passage. One end of the first orifice passage 102 connects to the pressure-receiving chamber 96 via the communicating window 42 of the first partition member 32. The other end of the first orifice passage 102 connects to the equilibrium chamber 98 via the communicating hole 44 of the first partition member 32 and the communicating hole 68 of the second partition member 34 superposed against one another in the axial direction. With this arrangement, the pressure-receiving chamber 96 and the equilibrium chamber 98 are connected to one another through the first orifice passage 102, permitting fluid flow between the two chambers 96, 98 via the first orifice passage 102.

The communicating passage 46 that connects in proximity to the other end of the circumferential groove 40 of the first partition member 32, together with the circumferential groove 40, is covered fluid-tightly by the small-diameter tube portion 24 of the second mounting member 14. The circumferential groove 40 and the communicating passage 46 cooperate to form a second orifice passage 104. One end of the second orifice passage 104 connects to the intermediate chamber 100 via the communicating passage 46, while the other end of the second orifice passage 104 connects to the equilibrium chamber 98 via the communicating hole 44 of the first partition member 32 and the communicating hole 68 of the second partition member 34. Thereby, the intermediate chamber 100 and the equilibrium chamber 98 communicate with one another through the second orifice passage 104, permitting fluid flow between the two chambers 98, 100 through the second orifice passage 104. As will be apparent from the preceding description, in this mode, the first orifice passage 102 and the second orifice passage 104 are formed by means of cooperation of the first partition member 32 and the second partition member 34. Since the communicating passage 46 connects to part of the circumferential groove 40, the second orifice passage 104 is formed in cooperation with part of the first orifice passage 102. However, the axial cross sectional area of the circumferential groove 40 differs from the axial cross sectional area of the communicating passage 46, while the axial cross sectional area of the communicating passage 46 is approximately the same as the size of the communicating holes 44, 68 of the first and second partition members 32, 34. Thus, the first orifice passage 102 and the second orifice passage 104 are individually tuned on the basis of the cross sectional area, length, and so on of the circumferential groove 40, the communicating passage 46, and the communicating holes 44, 68.

In this mode in particular, the resonance frequency of fluid caused to flow through the first orifice passage 102 is tuned so as to produce effective vibration damping action (high damping action) against vibration in a low frequency band of around 10 Hz, corresponding to engine shake, on the basis of the resonance behavior of the fluid. The resonance frequency of fluid caused to flow through the second orifice passage 104 is tuned to a medium frequency band of around 20-40 Hz, corresponding to idling vibration, on the basis of the resonance behavior of the fluid. With this arrangement, the second orifice passage 104 is tuned to a higher frequency band than the first orifice passage 102, and when vibration in the medium frequency band is input, effective vibration damping action (vibration isolating action through low spring) thereof is produced on the basis of the resonance behavior of the fluid caused to flow through the second orifice passage 104. Tuning of the first and second orifice passages 102, 104 can be accomplished, for example, through adjustment of passage length and passage cross sectional area of each orifice 102, 104 while giving consideration to characteristic values based on the spring rigidity of the walls of the pressure-receiving chamber 96, the equilibrium chamber 98, and the intermediate chamber 100, i.e. levels of elastic deformation of the diaphragm 88, movable plate 56, pressure adjustment rubber plate 74 or main rubber elastic body 16 corresponding to the level of pressure change needed to produce a given change in unit volume of these fluid chambers 94. Typically, the frequency at which the phase of pressure vibration transmitted through the orifice passage 102, 104 changes to assume an approximately resonant state can be understood to be the tuning frequency of the orifice passage 102, 104.

Using a fastening bolt (not shown), the nut portion 18 of the first mounting member 12 is fastened screwed to a mounting member on the power unit side, and the large-diameter tube portion 22 of the second mounting member 14 is affixed to an outer bracket (not shown), with the outer bracket fastened with a bolt or the like to a mounting member on the car body side. With this arrangement, the engine mount 10 is installed between the power unit and the car body, with the power unit supported in vibration damped fashion on the vehicle body.

In this installed state, an air line 106 is connected to the port 84 of the air passage 82 formed in the partition member 30, and the working air chamber 78 is connected to a switch valve 108 through this air line 106. The switch valve 108 is composed of an electromagnetic valve or the like, and selectively switches the working air chamber 78 between communication with the outside atmosphere and with a prescribed negative pressure source. The switch valve 108 is also connected to a control unit, not shown. In the control unit, required items of information are input from among information indicating status of the vehicle, such as car speed, engine rpm, reduction gear select position, throttle opening, and so on supplied by various sensors furnished on the car. On the basis of this information, switching operation of the switch valve 108 is carried out in accordance with a pre-established program, by means of microcomputer software or the like. Through appropriate switching control of the switch valve 108 depending on vibration input under various conditions such as the driving conditions of the car, pressure control of the working air chamber 78 is carried out for the purpose of achieving the intended vibration damping action.

Here, specific modes of operation in the engine mount 10 shall be described. Vibration damping action against vibration shall be described hereinbelow in consideration of three types of vibration, namely, (1) engine shake, which represents low frequency, large amplitude vibration; (2) driving booming noise, which represents high frequency, small amplitude vibration; and (3) idling vibration which represents medium frequency, medium amplitude vibration.

(1) Vibration Damping Action Against Engine Shake

When low frequency, large amplitude vibration such as engine shake is input, pressure fluctuations of very high amplitude are produced in the pressure-receiving chamber 96. The movable distance of the movable plate 56 has been established such that pressure fluctuations in the pressure-receiving chamber 96 are difficult to absorb through displacement of the movable plate 56 within its permitted movable distance range. With this arrangement, the pressure absorbing action of the movable plate 56 is substantially nonfunctional, and effective pressure fluctuations are produced in the pressure-receiving chamber 96.

That is, during input of low frequency, large amplitude vibration, the movable plate 56 and the intermediate chamber 100 are substantially nonfunctional. Thus, a level of fluid flow through the first orifice passage 102 is effectively assured by means of relative pressure fluctuations produced between the pressure-receiving chamber 96 and the equilibrium chamber 98 when such vibration is input, and effective vibration damping action (high attenuating action) against engine shake is attained on the basis of the resonance behavior of the fluid caused to flow through the first orifice passage 102.

The working air chamber 78 may be connected to either the atmosphere or to the negative pressure source. The pressure adjustment rubber plate 74 is suctioned and held against the floor of the working air chamber 78 (the upper end face of the second partition member 34), rendering the pressure adjustment rubber plate 74 nonfunctional so that the volume of the intermediate chamber 100 is unchanging. As a result, liquid pressure suction by the intermediate chamber 100 disappears, ensuring even more advantageously a level of fluid flow through the first orifice passage 102.

(2) Vibration Damping Action Against Driving Booming Noise

When driving booming noise or other such high frequency, small amplitude vibration higher than the tuning frequency of the second orifice passage 104 is input, pressure fluctuations of small amplitude are produced in the pressure-receiving chamber 96. During such pressure fluctuations the movable plate 56 effectively undergoes displacement, and by means of displacement of the movable plate 56 within its movable distance range, the pressure fluctuations of the pressure-receiving chamber 96 are efficiently transmitted to the intermediate chamber 100, so that in the intermediate chamber 100, liquid pressure suction action based on elastic deformation of the pressure adjustment rubber plate 74 is achieved. That is, when high frequency, small amplitude vibration is input, the liquid pressure suction function produced through cooperative action on the part of the movable plate 56, the intermediate chamber 100, and the pressure adjustment rubber plate 74 becomes operational, and pressure fluctuations in the pressure-receiving chamber 96 are absorbed by the intermediate chamber 100, thus avoiding markedly highly dynamic spring by the mount 10.

During input of high frequency, small amplitude vibration, the first orifice passage 102 and the second orifice passage 104, which are tuned to lower frequency bands, experience a marked rise in fluid flow resistance due to anti-resonance behavior, becoming substantially blocked off.

That is, while in this state, the pressure-receiving chamber 96 and the intermediate chamber 100 into which the pressure of the former has escaped each assume a cut-off state independent from the equilibrium chamber 98, the pressure adjustment rubber plate 74 which constitutes part of the wall of the intermediate chamber 100 is permitted to undergo elastic deformation relatively easily, due to the working air chamber 78 formed behind it being open to the atmosphere. In particular, the pressure adjustment rubber plate 74 has been given spring properties soft enough to sufficiently absorb elastic deformation produced by pressure fluctuations in the intermediate chamber 100 on the order of those created during input of high frequency, small amplitude vibration such as drive booming noise. Consequently, development of markedly highly dynamic spring due to substantial closing off of the first and second orifice passages 102, 104 is avoided, and good vibration damping action (vibration isolating action through low spring properties) against high frequency, small amplitude vibration is attained.

(3) Vibration Damping Action Against Idling Vibration

When idling vibration or other such medium frequency, medium amplitude vibration higher than the tuning frequency of the first orifice passage 102 is input, pressure fluctuations of a certain amplitude are produced in the pressure-receiving chamber 96. During these pressure fluctuations the movable plate 56 undergoes displacement, and by means of displacement of the movable plate 56 within its movable distance range, the pressure fluctuations of the pressure-receiving chamber 96 are transmitted to the intermediate chamber 100. During input of medium frequency, medium amplitude vibration, the first orifice passage 102, which are tuned to a lower frequency band, experiences a marked rise in fluid flow resistance due to anti-resonance behavior, becoming substantially blocked off.

In this state, the intermediate chamber 100 and the variable-capacity equilibrium chamber 98, in which effective pressure fluctuations are produced in the same manner as in the pressure-receiving chamber 96, are constituted so as to be connected through the second orifice passage 104 which has been tuned to the medium frequency band. Consequently, a level of fluid flow through the second orifice passage 104 is effectively assured by means of relative pressure fluctuations produced between the pressure-receiving chamber 96, the intermediate chamber 100, and the equilibrium chamber 98 when vibration is input, and effective vibration damping action (vibration isolating action through low spring properties) against idling vibration is attained on the basis of the resonance behavior of the fluid caused to flow through the second orifice passage 104.

In this mode, when vibration in the tuning frequency band of the second orifice passage 104 is input, the working air chamber 78 may be connected to either the atmosphere or to the negative pressure source. These can be set according to the required vibration damping characteristics, switching between them as appropriate.

Specifically, in this mode, the spring properties of the pressure adjustment rubber plate 74 making up the wall of the intermediate chamber 100 will vary depending on whether the working air chamber 78 is connected to the atmosphere or to the negative pressure source. First, with the working air chamber 78 connected to the atmosphere, the pressure adjustment rubber plate 74 is in the unconstrained state and exhibits soft spring properties. Where the working air chamber 78 is connected to the negative pressure source on the other hand, the pressure adjustment rubber plate 74 is subjected to negative pressure suction and deforms towards the working air chamber 78 side, and as the suction intensifies the pressure adjustment rubber plate 74 becomes superposed against the floor of the working air chamber 78, constraining deformation thereof so that it now exhibits hard spring characteristics. Consequently, the wall spring rigidity of the intermediate chamber 100 varies depending on whether the working air chamber 78 is connected to the atmosphere or to the negative pressure source, and as a result to tuning frequency of the second orifice passage 104 changes, and the frequency at which effective vibration damping action is achieved changes as well. As will be apparent thereby, the pressure adjustment rubber plate 74 has spring properties that are not as soft as those of the diaphragm 88, and its spring rigidity is such that on the basis of elastic deformation thereof, pressure fluctuations produced in the intermediate chamber 100 during input of medium frequency, medium amplitude vibration such as idling vibration the vibration cannot be absorbed, so that pressure fluctuations sufficient to create fluid flow through the second orifice passage 104 are produced in the intermediate chamber 100.

Accordingly, during the ordinary idling state or a fast idling state such as at startup or during operation of the air conditioner, by switching the switch valve 108 in order to selectively switch the working air chamber 78 to the atmosphere or to the negative pressure source, it is possible to attain even better vibration damping action by tuning the second orifice passage 104 with greater precision against idling vibration in different frequencies ranging from several Hz to several tens of Hz within a medium frequency range.

The element of modifying the tuning of the second orifice passage 104 by switching the switch valve 108 according to vehicle conditions within the frequency band in which idling vibration occurs is not an essential element of the invention. For example, in cases where the level of variation in idling vibration is relatively small, the working air chamber 78 may be kept normally connected to the negative pressure source during idling. Thus, it is possible in this state to more advantageously assure the level of fluid flow through the second orifice passage 104 and to tune it so as to more effectively attain vibration damping action against idling vibration, thereby affording a higher degree of vibration damping action.

Figure 7:
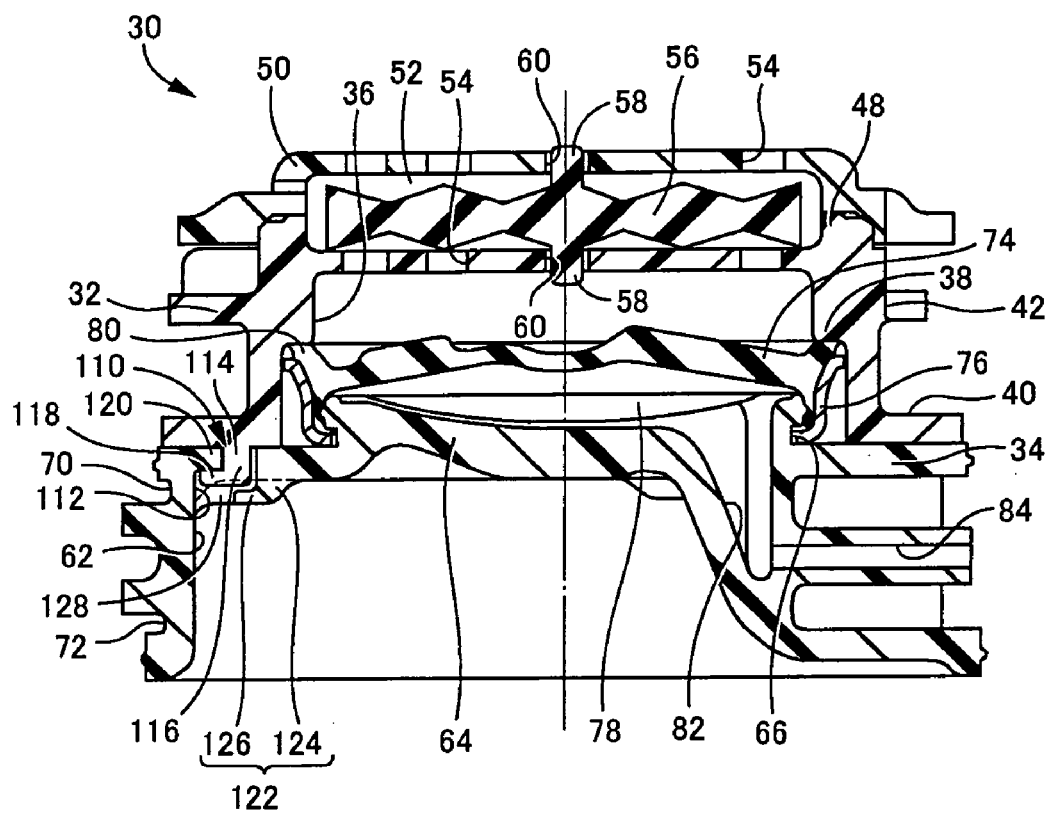
FIG. 7 is an enlarged vertical cross sectional view for illustrating one manufacturing process of the engine mount of FIG. 1.

The engine mount 10 pertaining to this mode has a characterizing feature relating to fastening the partition member 30 comprising the first and second partition members 32, 34 to the second mounting member 14. Specifically, as depicted in FIG. 7, prior to the partition member 30 being attached fitting into the second mounting member 14, the first partition member 32 and the second partition member 34 are held superposed together by means of a locking mechanism. This locking mechanism comprises locking projections 110 and locking holes 112.

The locking projections 110 are integrally formed so as to project downward at the lower end of the outer circumferential portion of the first partition member 32 around the opening of the center recess 36. In this mode in particular, three locking projections 110, 110, 110 are arranged at approximately equal intervals along the circumference of the lower end of the first partition member 32. Each locking projection 110 is composed of a leg portion 116 extending downward with a generally unchanging bowed cross section from a basal end portion 114 integrally formed with the lower end portion of the first partition member 32, and a head portion 118 spreading with a generally flat plate profile outwardly in the diametrical direction of the first partition member 32 from the distal end portion of the leg portion 116. In other words, the head portion 118 of flat plate shape extending in elongated shape in the circumferential direction of the first partition member 32 extends parallel to the lower end of the first partition member 32, and facing this lower end while spaced apart from it by a prescribed distance in the axial direction. The leg portion 116 rises upward from the edge at the lateral inner side and one edge in the direction lengthwise extension of the head portion 118, so as to extend towards the first partition member 32 with a generally unchanging "L" shaped cross section, and the distal end portion thereof is integrally formed with the first partition member 32, and constitutes the basal end portion 114 of the locking projection 110. As a result, the axial cross section of the locking projection 110 has a key shape overall. The locking projections 110 are situated in the laterally medial portion of the outer circumferential portion of the first partition member 32, i.e. in the laterally medial portion of an annular zone between the outer circumferential edge and the center recess 36 of the first partition member 32. The diametrically outward-facing distal end portion of the head portions 118 is situated diametrically inward from the outer circumferential edge of the first partition member 32.

In this mode, the thickness dimension of the locking projection 110 is substantially unchanging over its entirety. The basal end portion 114 of the locking projection 110 is disposed at the upper end portion of the locking projection 110, and is integrally formed generally orthogonal to the lower end of the first partition member 32. By means of this design, stress concentrations are produced readily in the basal end portion 114 of the locking projection 110, producing a structure that is weakest in its basal end portion 114.

Meanwhile, the locking holes 112 are formed in the laterally medial portion of the outer circumferential portion around the center projecting portion 64 of the second partition member 34, and penetrate in the axial direction through the upper end of the second partition member 34 around the center projecting portion 64 and the floor of the lower recess 62. The locking holes 112 take the form of elongated slots extending a prescribed length in the circumferential of the second partition member 34. In this mode in particular, three locking holes 112, 112, 112 are formed at approximately equal intervals on the circumference of the second partition member 34. Of the three locking holes 112, 112, 112, the circumferential end of one connects to the circumferential end of the communicating hole 68 of the second partition member 34, so this locking hole 112 appears to be larger than the other two locking holes 112, 112.

The locking holes 112 extend with a generally constant width dimension in the circumferential direction, with the locking hole 112 width dimension being slightly larger than the width dimension of the locking projections 110. Additionally, the locking hole 112 circumferential length: L is larger than the locking projection 110 circumferential length: l; while not limited in particular, the ratio: L/l of locking hole 112 circumferential length: L to locking projection 110 circumferential length: l is preferably such that $1.2 \leq L/l \leq 3$, more preferably $1.5 \leq L/l \leq 2$.

At one circumferential end of the locking hole 112 is integrally formed an outer circumferential wall portion 120. The outer circumferential wall portion 120 is of elongated block form extending along the outer circumferential edge of the locking hole 112 from one end to the other end in the circumferential direction. The upper end face of the outer circumferential wall portion 120 is generally coplanar with the upper face of the second partition member 34 onto which the upper end of the locking hole 112 opens, while the lower edge (face) of the outer circumferential wall portion 120 is positioned above the floor portion (face) of the lower recess 62 of the second partition member 34 onto which the lower end of the locking hole 112 opens. That is, the axial dimension of the outer circumferential wall portion 120 is smaller than the axial dimension of the locking hole 112.

The width dimension of the outer circumferential wall portion 120 is smaller by a prescribed amount than the width dimension of the locking hole 112, for example, approximately half the width dimension of the locking hole 112. The circumferential length of the outer circumferential wall portion 120 is smaller than the circumferential length of the locking hole 112, for example, approximately half the circumferential length of the locking hole 112. In this mode in particular, the width dimension of the outer circumferential wall portion 120 is slightly smaller than distance in the axis-perpendicular direction (lateral direction) between the lateral outside edge portion of the head portion 118 and the leg portion 116 extending laterally inward along the head portion 118 in the locking projection 110. Also, the circumferential length of the outer circumferential wall portion 120 is slightly smaller than distance in the circumferential direction between one circumferential edge of the head portion 118 and the leg portion 116 extending along other circumferential edge of the head portion 118.

A cover portion 122 is integrally formed around each locking hole 112 in the second partition member 34. The cover portion 122 includes an upright wall portion 124 of generally unchanging rectangular frame cross section extending downward from the rim of the opening of the locking hole 112, and a roof wall portion 126 of generally flat plate shape bent in the diametrical direction of the second partition member 34 from the distal edge portion of the upright wall portion 124. The roof wall portion 126 extends parallel to the floor of the lower recess 62 of the second partition member 34 and to the outer circumferential wall portion 120 integrally formed with the edge of the locking hole 112. For the cover portion 122 disposed on the locking hole 112 which connects to the communicating hole 68 of the second partition member 34, in order to ensure sufficient size of the communicating hole 68, the size of the cover portion 122 is relatively smaller than the size of the cover portions 122 disposed in the other two locking holes 112, 112.

In particular, in the portion of the locking hole 112 rim where the outer circumferential wall portion 120 is integrally formed, the upright wall portion 124 is lacking, and part of the roof wall portion 126 has a notched shape spaced apart from the outer circumferential wall portion 120 by a prescribed distance in the axial direction and the axis-perpendicular direction (diametrical direction) in order to avoid the outer circumferential wall portion 120. Specifically, the cover portion 122 is absent around the outer circumferential wall portion 120, and a gap 128 of prescribed size is furnished between the cover portion 122 and the outer circumferential wall portion 120, while a notched portion 130 is furnished to the cover portion 122 around the outer circumferential wall portion 120. The axial dimension in the gap 128 from the lower end face of the outer circumferential wall portion 120 to a location approximately the same height as the upper end face of the roof wall portion 126, i.e. the distance between the axially opposed faces of the outer circumferential wall portion 120 and the notched portion 130, is slightly larger than the thickness dimension of the head portion 118 of the locking projection 110; in this mode in particular, it is smaller than twice the thickness dimension of the head portion 118. One circumferential end of the notched portion 130 of the cover portion 122 is arranged approximately coplanar with one circumferential end of the outer circumferential wall portion 120, while the other circumferential end of the notched portion 130 is positioned circumferentially outward from the other circumferential end of the outer circumferential wall portion 120, so that the circumferential length of the notched portion 130 is greater than the circumferential length of the outer circumferential wall portion 120. The width dimension of the notched portion 130 is smaller than the width dimension of the outer circumferential wall portion 120.

The size of the notched portion 130 of the cover portion 122 is sufficiently smaller than the spread of the head portion 118 of the locking projection 110 in the axis-perpendicular direction, and hence smaller than the overall size of the locking projection 110 including the leg portion 116 and the head portion 118. Consequently, by means of the locking mechanism comprising the cover portion 122 of this mode being furnished with the outer circumferential wall portion 120, the gap 128, and the notched portion 130, the upright wall portion 124 of the cover portion 122 is formed partially on the circumference of the locking hole 112. The size of the roof wall portion 126 of the cover portion 122 is one-half, preferably two-thirds, the size of the downward opening of the locking hole 112, for example, so that the roof wall portion 126 is formed with a size smaller than the opening of the locking hole 112. As a result, the cover portion 122 constitutes a pouch structure that opens towards the outer circumferential wall portion 120, to the outer circumferential side of the locking hole 112.

Figure 8:
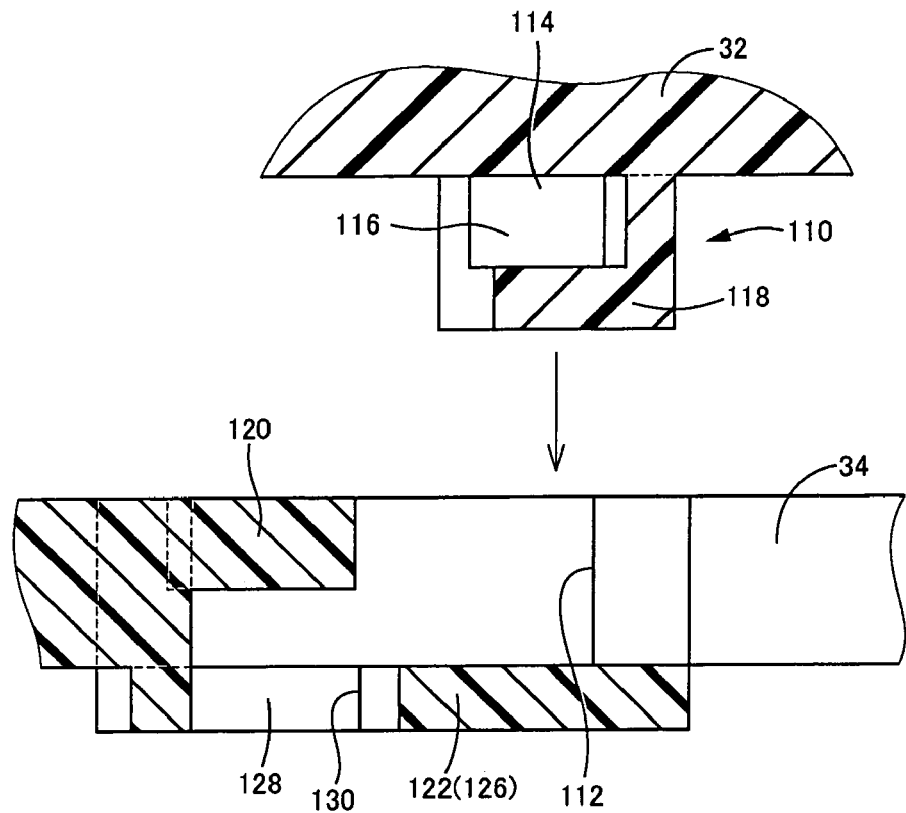
FIG. 8 is an enlarged vertical cross sectional view for illustrating another manufacturing process of the engine mount of FIG. 1.
Figure 9:
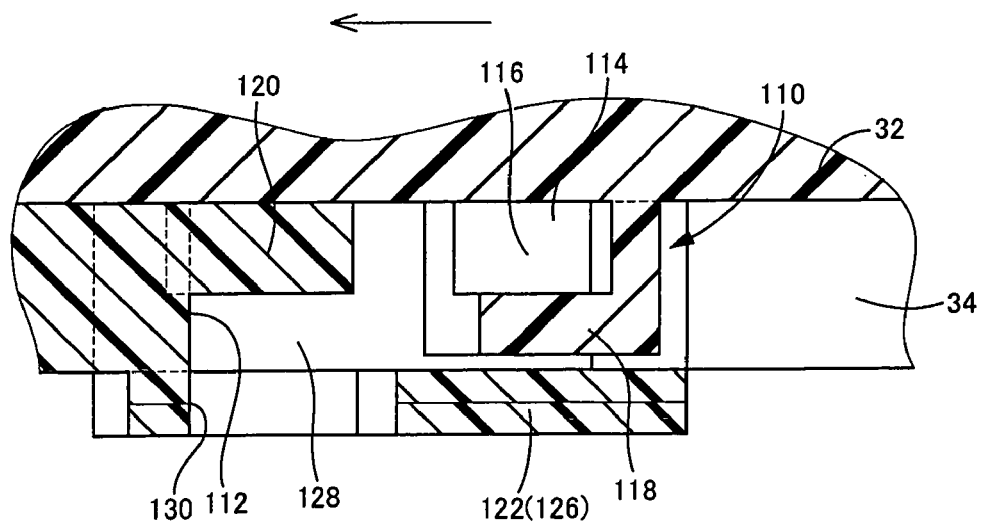
FIG. 9 is an enlarged vertical cross sectional view for illustrating yet another manufacturing process of the engine mount of FIG. 1.

As shown in FIGS. 8 and 9, the first partition member 32 comprises the three locking projections 110, and the second partition member 34 comprises the three locking holes 112, outer circumferential wall portions 120, and cover portions 122. The first partition member 32 and the second partition member 34 are superposed in the axial direction with each locking projection 110 positioned above the second circumferential end of each locking hole 112 on the side thereof opposite from the outer circumferential wall portion 120 at the first circumferential side thereof, and the locking projections 110 are passed through the locking holes 112.

Figure 10:
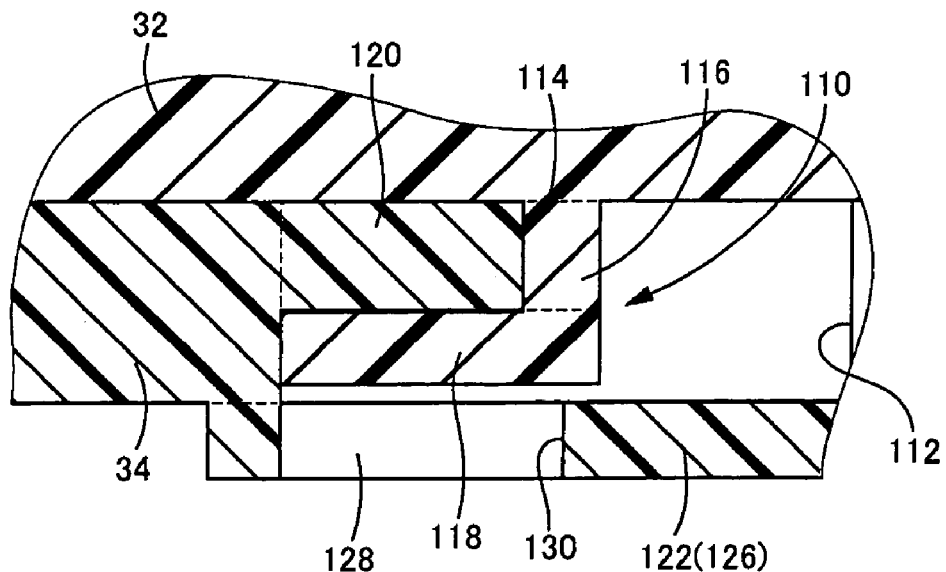
FIG. 10 is an enlarged vertical cross sectional view for illustrating one manufacturing process different from those illustrated in FIGS. 8 and 9, while corresponding to one process shown in FIG. 7.

The first partition member 32 and the second partition member 34 superposed against each other in the axial direction are then turned relative to each other about the center axes of two members 32, 34 extending in the direction of superposition. Thus, the locking projections 110 move towards the circumferential end on the outer circumferential wall portion 120 side within the locking holes 112. By superposing the outer circumferential wall portion 120 and the locking projection 110 against each other so that the outer circumferential wall portion 120 is enclosed substantially in its entirety by the leg portion 116 and the head portion 118 of the locking projection 110 as depicted in FIG. 10, the locking projection 110 is locked in place within the locking hole 112 furnished with the outer circumferential wall portion 120. With this arrangement, there is constituted a rotary type locking mechanism, thereby the locking projections 110 are locked at all once in the outer circumferential wall portions 120 of the locking holes 112, by means of turning the first partition member 32 and the second partition member 34 relative to one another. By means of this locking mechanism, the first partition member 32 and the second partition member 34 are held superposed in the axial direction. The distal end portion of the locking projection 110 on the outer circumferential wall portion 120 side may be positioned either abutting or not abutting the circumferential end of the locking hole 112. In this mode, when the first partition member 32 and the second partition member 34 are rotated relative to one another so that the two members 32, 34 are held superposed by the locking mechanism, the communicating hole 44 of the first partition member 32 and the communicating hole 68 of the second partition member 34 become aligned in the axial direction, so the locking mechanism also functions as positioning means for the first partition member 32 and the second partition member 34. As will be apparent from the preceding description, locking mechanisms comprising the locking projection 110 and the locking hole 112 are disposed at three locations on the circumference in the outer circumferential portions of the first partition member 32 and the second partition member 34.

In this mode in particular, the seal lip 80, which provides fluid-tight seals to the working air chamber 78 and the intermediate chamber 100 on the basis of being interposed between and undergoing compressive deformation in the axial direction between the step portion 38 of the first partition member 32 and the mating ring 76 of the second partition member 34 when the first partition member 32 and the second partition member 34 are superposed in the axial direction of the second mounting member 14, is able to function as an elastic material sandwiched between the center portion of the first partition member 32 and the center portion of the second partition member 34. Based on the elastic recovery force of the seal lip 80, force (reaction force) acting in the direction urging the first partition member 32 and the second partition member 34 away from each other is imparted to them, thereby further enhancing the locking action of the locking projections 110 and the locking holes 112 (outer circumferential wall portions 120).

As noted, the first and second partition members 32, 34 held superposed in this manner are inserted into the integrally vulcanization molded component of the main rubber elastic body 16 incorporating the first mounting member 12 and the second mounting member 14, from the other opening of the second mounting member 14; and the second mounting member 14 is then subjected to a diameter constriction process so that the outer circumferential faces of the first and second partition members 32, 34 are fastened fitting into the second mounting member 14 via the seal rubber layer 28 formed covering the inside peripheral face of the small-diameter tube portion 24 of the second mounting member 14.

Here, the locking projections 110 formed on the first partition member 32 pass through the openings of the locking holes 112 and project out to the equilibrium chamber 98 side, while the cover portions 122 formed on the second partition member 34 also project out to the equilibrium chamber 98 side of the openings of the locking holes 112, i.e. to the side of projection of the locking projections 110, with the locking projections 110 covered substantially entirely by the cover portions 122, preventing them from lying exposed on the equilibrium chamber 98 side. The inward side of the cover portion 122 provided to the locking projection 110 is filled with the noncompressible fluid of the equilibrium chamber 98, entering through the notched portion 130 of the cover portion 122. The head portion 118 of the locking projection 110 is positioned above the roof wall portion 126 and the notched portion 130 of the cover portion 122. In this mode, the head portion 118 of the locking projection 110 and the roof wall portion 126 of the cover portion 122 on the one hand, and the leg portion 116 of the locking projection 110 and the upright wall portion 124 of the cover portion 122 on the other, are each positioned facing one another across a small gap, but could be positioned in abutment with one another instead.

Accordingly, in the automotive engine mount 10 constructed in the above fashion, in order to advantageously position the working air chamber 78, the intermediate chamber 100, and the first and second orifice passages 102, 104, the partition member 30 is constructed by superposing the first partition member 32 and the second partition member 34 in the axial direction. Since the locking mechanism maintains them in this axially superposed condition prior to being fastened fitting into the second mounting member 14, there is afforded excellent ease of handling and management of the partition member 30, as well as ease of the attachment operation to the second mounting member 14.

In this mode in particular, utilizing reaction force based on elastic deformation of the seal lip 80 sandwiched between the center portion of the first partition member 32 and the center portion of the second partition member 34, there is afforded a higher level of locking force of the locking projections 110 with the outer circumferential wall portions 120. Thus, the superposed state of the first partition member 32 and the second partition member 34 may be stabilized further, without any special process steps or increase in the number of parts.

In association with constriction of the diameter of the second mounting member 14 (the small-diameter tube portion 24), the seal rubber layer 28 disposed between the partition member 30 and the small-diameter tube portion 24 undergoes elastic deformation so as to contract in the axial direction by an amount equivalent to compressive deformation in the diametrical direction (thickness direction). In association therewith, the first partition member 32 and the second partition member 34 in intimate contact with the seal rubber layer 28 undergo displacement away from one another in the axial direction. As a result, stress concentrations and high strain levels are produced in the locking projections 110 and the outer circumferential wall portions 120 of the locking mechanism linking the first partition member 32 and the second partition member 34 in the axial direction, with the risk that a locking projection 110 or other part may break off.

However, since the cover portions 122 of the second partition member 34 cover substantially entirely the locking projections 110 projecting out on the equilibrium chamber 98 side, even if a locking projection 110 should break off due to axial displacement of the first partition member 32 and the second partition member 34 as described above, the locking projection 110 will be supported by the cover portion 122, preventing the locking projection 110 from falling into the equilibrium chamber 98.

In this mode in particular, the opening of the locking hole 112 to the equilibrium chamber 98 side will be made smaller by at least one-half, and preferably at least two-thirds, by the cover portion 122. The distance between the roof wall portion 126 of the cover portion 122 and the equilibrium chamber 98-side opening of the locking hole 112 housing the head portion 118 of the locking projection 110 is smaller than twice the thickness dimension of the head portion 118. The size of the notched portion 130 formed in the cover portion 122 is smaller than the size of the head portion 118. Consequently, the cover portion 122 will reliably prevent a broken locking projection 110 from falling into the equilibrium chamber 98.

In this mode, the basal end portion 114 of the locking projection 110 is integrally formed so as to be generally orthogonal to the lower end of the first partition member 32, and is the weakest structure in terms of strength in the locking projection 110, so that the locking projection 110 will tend to break off at its basal end portion 114. That is, by deliberately providing a section that is weak in terms of strength, directionality can be imparted to breaking off of the locking projection 110. Additionally, by making the basal end portion 114 the weak section, in the event that the basal end portion 114 breaks so that the locking projection 110 separates from the first partition member 32, it can be ensured that the locking projection 110 is larger in shape than the notched portion 130 of the cover portion 122. Thus, the locking projection 110 will be more stably supported by the cover portion 122.

Additionally, in this mode, a plurality of locking mechanisms are provided in the outer circumferential portions of the first and second partition members 32, 34, and the locking projection 110 in the locking mechanism has a key shape, while the cover portion 122 is of pouch structure. Thus, the first partition member 32 and the second partition member 34 can be maintained in a stable fastened state and stable state of being superposed in the axial direction, while making it more difficult for a locking projection 110 to drop into the interior of the equilibrium chamber 98.

Consequently, it is possible to eliminate various problems which could be caused by a locking projection 110 falling into the equilibrium chamber 98 or other fluid chamber 94, such as clogging of the first or second orifice passage 102, 104 by the locking projection 110 or damage to the diaphragm 88 caused by the locking projection 110 contacting the diaphragm 88, so that the intended quality and reliability of vibration damping ability are favorably maintained.

With regard to the fastening force holding the first partition member 32 and the second partition member 34 in the superposed state, with the first partition member 32 and the second partition member 34 having been fastened fitting into the second mounting member 14, breaking off of the locking projection 110 in a locking mechanism will pose no particular problem. That is because the fastening force in question is produced by being fastened fitting thusly into the second mounting member 14. Consequently, there is no need to use iron or other such high strength material for the first partition member 32 in order to ensure adequate strength of the locking projections 110, making it possible to integrally form the locking projections 110 and the first partition member 32 of synthetic resin material or the like as taught in this mode, whereby lower manufacturing costs and lighter weight of the mount 10 may be advantageously achieved.

Additionally, the cover portion 122 located a prescribed distance away in the axial direction from the outer circumferential wall portion 120 of the second partition member 34 is furnished with a notched portion 130 whose circumferential length is greater than the circumferential length of the outer circumferential wall portion 120. By means of this design, when the second partition member 34 is molded using a mold (not shown), it is possible to insert part of the mold in from the upper opening of the locking hole 112 in order to form the upper edge and peripheral wall of the outer circumferential wall portion 120, the inside peripheral portion of the upright wall portion 124 of the cover portion 122, and the upper end of the roof wall portion 126 of the cover portion 122, while inserting part of the mold in through the notched portion 130 from below the cover portion 122, in order to form the lower edge of the outer circumferential wall portion 120, the outer circumferential portion of the upright wall portion 124, and the lower end of the roof wall portion 126. Consequently, the outer circumferential wall portion 120 and the cover portion 122 can be easily integrally formed with the second partition member 34, and ease of fabrication and reduction in production cost can be more advantageously improved.

Also, in this mode, a gap is furnished all the way around the circumference between the upper end of the mating ring 76 in the second partition member 34 and the peripheral wall of the center recess 36 in the first partition member 32. With the partition member 30 fastened fitting in the second mounting member 14 in association with diameter constriction of the second mounting member 14, the first partition member 32 and the second partition member 34 should experience relative displacement in the axial direction due, for example, to breaking off of a locking projection 110 so that the mating ring 76 and the peripheral wall portion of the center recess 36 experience relative displacement, due to the existence of this gap, the mating ring 76 and the peripheral wall portion of the center recess 36 can be prevented from striking against one another and creating high levels of strain or stress concentrations. Consequently, the fluid-tightness of the working air chamber 78 is stably maintained by the lower end of the mating ring 76, and the fluid-tightness of the intermediate chamber 100 by the seal lip 80 at the upper end of the mating ring 76, so that the desired vibration damping action may be more consistently attained.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, in the illustrated embodiment three locking mechanisms are constituted by providing three locking projections 110 and three locking holes 112, with these locking mechanisms being spaced at approximately equal intervals along the circumference of the partition member 30. However, the locking mechanisms are not limited to this number, and can be provided in a number of one, two, or more than three. The plurality of locking mechanisms can also be disposed at unequal intervals along the circumference.

Also, whereas in the illustrated embodiment, the locking projections 110 are provided to the first partition member 32 and the locking holes 112 are provided to the second partition member 34, it would be possible to instead provide the locking projections to the second partition member 34 and provide the locking holes 112 to the first partition member 32. Alternatively, appropriately apportion a number of locking projections 110 and locking holes 112 respectively to the first partition member 32 and the second partition member 34.

In the illustrated embodiment, the locking projection 110 locks into the outer circumferential wall portion 120 integrally formed at the edge of the locking hole 112. However, the outer circumferential wall portion 120 could be dispensed with, so that the locking projection 110 instead locks directly with the circumferential edge of the locking hole 112 or the like.

Further, in the illustrated embodiment, a rotary type locking mechanism was employed, but it would be possible to employ instead, for example, a sliding type locking mechanism. Thus, the locking projection 110 is passed through the locking hole 112 and the locking projection 110 is locked in place in the locking hole 112 by moving the first partition member 32 and the second partition member 34 relative to one another in the axial direction or axis-perpendicular direction.

The shape, size, and construction of the cover portion 122 are not limited to those taught herein by way of example. For example, whereas in the preceding modes the cover portions 122 are integrally formed with the second partition member 34 furnished with the locking holes 112, the cover portions 122 could instead by formed as separate elements, and attached about the locking holes 112 of the second partition member 34. In association with this, the cover portion 122 and the outer circumferential wall portion 120 of the locking hole 112 will be formed as separate elements, thereby obviating the need to provide a special notched portion in order for the cover portion 122 and the outer circumferential wall portion 120 of locking hole 112 to be integrally formed by means of molding, making it possible for example for the cover portion 122 to be of a shape and size covering the entire lower opening of the locking hole 112.

Figure 11:
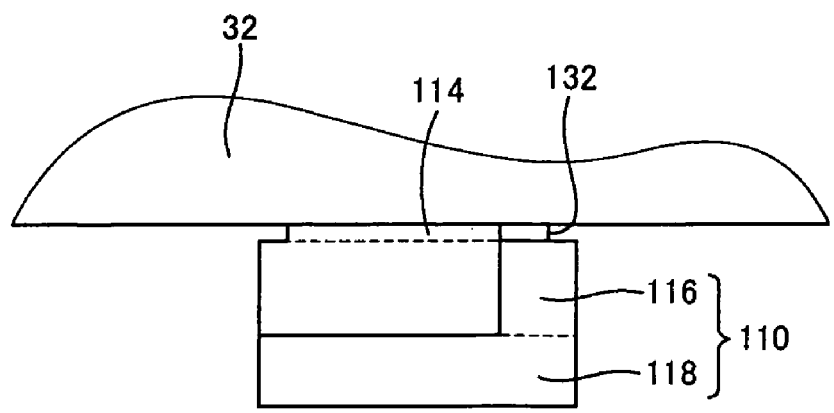
FIG. 11 is a side elevational view of a first partition member of the engine mount of construction according to another preferred embodiment of the invention.

As depicted in FIG. 11, by forming a groove portion 132 extending a prescribed length in the circumferential direction on the basal end portion 114 of the locking projection 110, the thickness dimension of the basal end portion 114 can be made smaller than the thickness dimension of the leg portion 116 or the head portion 118, whereby it is possible to further reduce the strength of the basal end portion 114. In FIG. 11, members and parts substantially identical in those in the preceding modes have been assigned identical symbols in the drawing, and are not described in detail.

The shape, size, construction, location, number and other aspects of the first orifice passage 102 and the second orifice passage 104 can be modified appropriately depending on the required vibration damping characteristics and ease of fabrication, and are not limited to those taught hereinabove by way of example.

Further, in the preceding modes, with the movable plate 56 positioned in the center of the constrained installation zone 52, a gap is formed around the entire perimeter of the movable plate 56. However, it would be possible to pre-attach the movable plate 56 in the thickness direction thereof in an elastically abutting state, or in a compressed state, against a portion of the constrained installation zone 52. That is, even with the movable plate 56 attached in the abutting state or compressed state in its thickness direction to the constrained installation zone 52, a pressure differential acting on the upper and lower faces of the movable plate 56 will produce pressure suctioning action of the pressure-receiving chamber 96 on the basis of elastic deformation of the movable plate 56. Additionally, by pre-attaching the movable plate 56 housed in the abutting state or compressed state within the constrained installation zone 52, shock resulting from the movable plate 56 striking against the first partition member 32 or the cap member 50 can be more advantageously avoided.

Whereas in the illustrated embodiment, a movable plate 56 which is arranged physically independently of the first and second partition members 32, 34 making up the partition member 30 and which is capable of free displacement by a prescribed distance was employed as the movable member, it would be possible to instead employ a movable film attached at its outer circumferential edge to the first partition member 30 so as to permit displacement and deformation based on elastic deformation of its center portion, and to thereby the allows transmission of pressure from the pressure-receiving chamber 96 to the intermediate chamber 100. Such a movable film represents a structure known in the art, and will not be described in detail.

While the preceding embodiment were furnished with a second orifice passage 104, an intermediate chamber 100, a movable plate 56, a pressure adjustment rubber plate 74, a working air chamber 78, a switch valve 108 and so on, these are not indispensable elements. That is, in the present invention, provided that the fluid filled mount has a construction wherein a partition member composed of a plurality of member superposed in the axial direction is fastened fitting into the second mounting member via a seal rubber layer, other elements of the mounting may be modified appropriately.

Additionally, in the preceding embodiment, the invention is described as being implemented in an automotive engine mount 10, the invention could of course implemented in an automotive body mount or differential mount, or in vibration damping mounts for vibrating objects of various kinds besides automobiles.

What is claimed is:

1. A fluid filled type vibration damping device comprising a first mounting member;
   a second mounting member of tubular shape, the first mounting member being disposed on a side of one opening of the second mounting member;
   a main rubber elastic body elastically connecting the first mounting member and the second mounting member;
   a flexible film by which an other opening of the second mounting member is sealed off fluid-tightly, thereby forming between opposing faces of the main rubber elastic body and the flexible film a fluid chamber in which a non-compressible fluid is sealed; and
   a partition member supported by the second mounting member, with the fluid chamber divided by the partition member into a pressure-receiving chamber whose wall is partially defined by the main rubber elastic body and an equilibrium chamber whose wall is partially defined by the flexible film, and with an orifice passage connecting the pressure-receiving chamber and the equilibrium chamber being formed,
   wherein:
   the partition member comprises a first member and a second member superposed together in an axial direction of the second mounting member;
   a locking projection is formed on one of the first member and the second member and a locking hole is formed on an other, with the locking projection being inserted through the locking hole to effect locking so as to constitute a locking mechanism for holding the first member and the second member in a superposed state;
   outer circumferential faces of the first member and the second member held in the superposed state by the locking mechanism are fastened fitting into the second mounting member via a seal rubber layer covering an inner circumferential face of a tubular wall portion of the second mounting member by constricting an diameter of the tubular wall portion; and
   the first member or the second member in which the locking hole has been formed thereon includes a cover portion that covers an opening of the locking hole from a side thereof to which the locking projection projects.

2. A fluid filled type vibration damping device according to claim 1, wherein the orifice passage is formed by the first member and the second member.

3. A fluid filled type vibration damping device according to claim 1, wherein the locking projections and the locking holes are formed at multiple locations on a circumference of an outer peripheral portion of the first member and the second member respectively.

4. A fluid filled type vibration damping device according to claim 1, wherein the cover portion formed on the first member or the second member includes an upright wall portion rising up from a rim of the locking hole towards a projection side of the locking projection, and a roof wall portion bending from a distal edge of the upright wall portion so as to be spaced apart while covering the locking hole, with the upright wall portion being formed along a portion of a circumference of the locking hole so that the cover portion is open to a side, and with the roof wall portion being formed with a size equal to or smaller than the opening of the locking hole.

5. A fluid filled type vibration damping device according to claim 1, wherein in the first member or the second member in which the locking hole has been formed, an outer circumferential wall portion projecting in a direction of projection of the locking projection is formed at an outer circumferential edge of the first or second member, and the cover portion has a pouch structure opening on an outer peripheral side towards the outer circumferential wall portion, while the locking projection includes a leg portion passing through the locking hole and a head portion bending in a hooked shape from a projecting distal end of the leg portion, and is locked in place with the head portion extending towards the outer circumferential wall portion from the locking hole.

6. A fluid filled type vibration damping device according to claim 1, wherein the first member and the second member are superposed with an elastic material sandwiched between their center portions, and provided with the locking mechanisms at multiple locations in an outer circumferential portions thereof.

7. A fluid filled type vibration damping device according to claim 1, wherein the first member has a movable member attached in a center portion thereof, while the second member has a working air chamber formed by a recess formed in a center portion thereof and covered by a rubber cover.

8. A fluid filled type vibration damping device according to claim 1, wherein the locking projection has a structure weakest in terms of strength at a basal end thereof.

9. A fluid filled type vibration damping device according to claim 1, wherein the locking projection has a groove at an basal end thereof, the groove is open in an outer circumference of the locking projection.

* * * * *